United States Patent
Xue et al.

(10) Patent No.: US 9,059,869 B2
(45) Date of Patent: Jun. 16, 2015

(54) INTERFACE SELECTION IN A HYBRID COMMUNICATION DEVICE

(71) Applicant: QUALCOMM Incorporated, San Diego, CA (US)

(72) Inventors: Qi Xue, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 13/647,580

(22) Filed: Oct. 9, 2012

(65) Prior Publication Data

US 2014/0098796 A1    Apr. 10, 2014

(51) Int. Cl.
| | |
|---|---|
| H04J 3/00 | (2006.01) |
| H04L 12/54 | (2013.01) |
| H04L 12/729 | (2013.01) |
| H04W 48/18 | (2009.01) |
| H04L 12/707 | (2013.01) |
| H04L 29/12 | (2006.01) |

(52) U.S. Cl.
CPC ......... *H04L 12/5692* (2013.01); *H04L 61/6077* (2013.01); *H04L 45/125* (2013.01); *H04W 48/18* (2013.01); *H04L 45/24* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | |
|---|---|---|---|
| 2003/0103521 A1* | 6/2003 | Raphaeli et al. | 370/445 |
| 2006/0015636 A1* | 1/2006 | Skraba et al. | 709/232 |
| 2006/0056311 A1 | 3/2006 | Han et al. | |
| 2007/0115973 A1* | 5/2007 | Koga et al. | 370/389 |
| 2007/0204300 A1* | 8/2007 | Markley et al. | 725/46 |
| 2008/0310419 A1* | 12/2008 | Bansal et al. | 370/395.6 |
| 2011/0153815 A1 | 6/2011 | Aoki | |
| 2011/0191484 A1* | 8/2011 | Babbar et al. | 709/228 |

(Continued)

FOREIGN PATENT DOCUMENTS

| | | |
|---|---|---|
| WO | 2008022902 | 2/2008 |
| WO | 2014059004 | 4/2014 |

OTHER PUBLICATIONS

PCT Application No. PCT/US2013/064107 International Search Report, Jan. 24, 2014, 11 pages.

(Continued)

*Primary Examiner* — Jung-Jen Liu
(74) *Attorney, Agent, or Firm* — DeLizio Law, PLLC

(57) ABSTRACT

A hybrid device can be configured to select a transmit interface to attempt to ensure that each network interface of the hybrid device supports unidirectional traffic. Each of the plurality of network interfaces of the hybrid device can be categorized into one of a set of interface classes based on whether incoming traffic is received at the network interface and/or whether outgoing traffic is transmitted from the network interface. A transmit interface class is selected from the set of interface classes based, at least in part, on a priority level associated with each of the interface classes. One of the network interfaces that belongs to the transmit interface class is selected as a transmit interface for transmitting the frame on the communication network.

30 Claims, 6 Drawing Sheets

(56) References Cited

U.S. PATENT DOCUMENTS

| | | | |
|---|---|---|---|
| 2012/0140651 A1* | 6/2012 | Nicoara et al. | 370/252 |
| 2012/0155256 A1* | 6/2012 | Pope et al. | 370/230 |
| 2012/0316689 A1* | 12/2012 | Boardman et al. | 700/292 |
| 2013/0002409 A1* | 1/2013 | Molina et al. | 340/12.32 |

OTHER PUBLICATIONS

"PCT Application No. PCT/US2013/064107 Written Opinion", Sep. 23, 2014, 7 pages.

* cited by examiner

INTERFACE SELECTION IN A HYBRID COMMUNICATION DEVICE

BACKGROUND

Embodiments of the inventive subject matter generally relate to the field of communication networks and, more particularly, to interface selection in a hybrid communication device.

Hybrid communication networks typically comprise multiple network devices that implement multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable network devices that forward frames between the different network technologies and media to form a single, extended communication network. Hybrid communication networks typically present multiple frame delivery routes between any two hybrid devices.

SUMMARY

Various embodiments for selecting interfaces in a hybrid device are disclosed. In one embodiment, a plurality of network interfaces associated with a hybrid device is classified into one or more interface classes based, at least in part, on whether each of the plurality of network interfaces is scheduled to transmit and receive communication via the network interface. A transmit interface class is selected from the one or more interface classes based, at least in part, on a priority level associated with each of the one or more interface classes. A first of the plurality of network interfaces that belongs to the transmit interface class is selected as a transmit interface for the frame, where a network device is reachable via the transmit interface of the hybrid device. The hybrid device transmits the frame to the network device via the selected transmit interface.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although in some embodiments, the transmit interface selection mechanism can be implemented for hybrid devices comprising a wireless local area network (WLAN) interface (e.g., IEEE 802.11 interface), a powerline network interface (e.g., HomePlug® AV interface) and an Ethernet interface, in other embodiments the transmit interface selection mechanism can be implemented for hybrid devices that may comprise other suitable types of network interfaces and that implement other standards/protocols (e.g., Multimedia over Coax Alliance (MoCA), WiMAX®, etc.). In other instances, well-known instruction instances, protocols, structures, and techniques have not been shown in detail in order not to obfuscate the description.

A hybrid device comprises multiple network interfaces, each of which couples the hybrid device to a corresponding (possibly distinct) communication network segment of a hybrid communication network. The multiple interfaces between hybrid devices can implement multiple communication protocols (or access technologies) and can result in multiple communication routes between the two hybrid devices. Multiple transmission routes between two network devices can result in contention, communication loops, and the use of non-optimal frame transmission routes in the hybrid communication network. Functionality can be implemented to utilize the multiple interfaces that exist between hybrid devices to improve network utilization, performance, and efficiency. This can be achieved by using different network interfaces depending on the direction of the traffic (whether incoming or outgoing) at a particular network interface. More specifically, a source hybrid device can select a first network interface to transmit frames to a destination hybrid device and can receive frames from the destination hybrid device via a second network interface (that is distinct from the first network interface). For example, if the source hybrid device and the destination hybrid device each have a WLAN interface and a PLC interface, then the source hybrid device may transmit frames (to the destination hybrid device) via the WLAN interface and may receive frames (from the destination hybrid device) via the PLC interface. Selecting a transmit interface to ensure (whenever possible) that each network interface of the hybrid device supports unidirectional traffic can minimize contention/collision, out of order frame delivery, overhead, and scheduling conflicts. Such a mechanism can improve the throughput, frame delivery, and interface efficiency.

Figure 1:
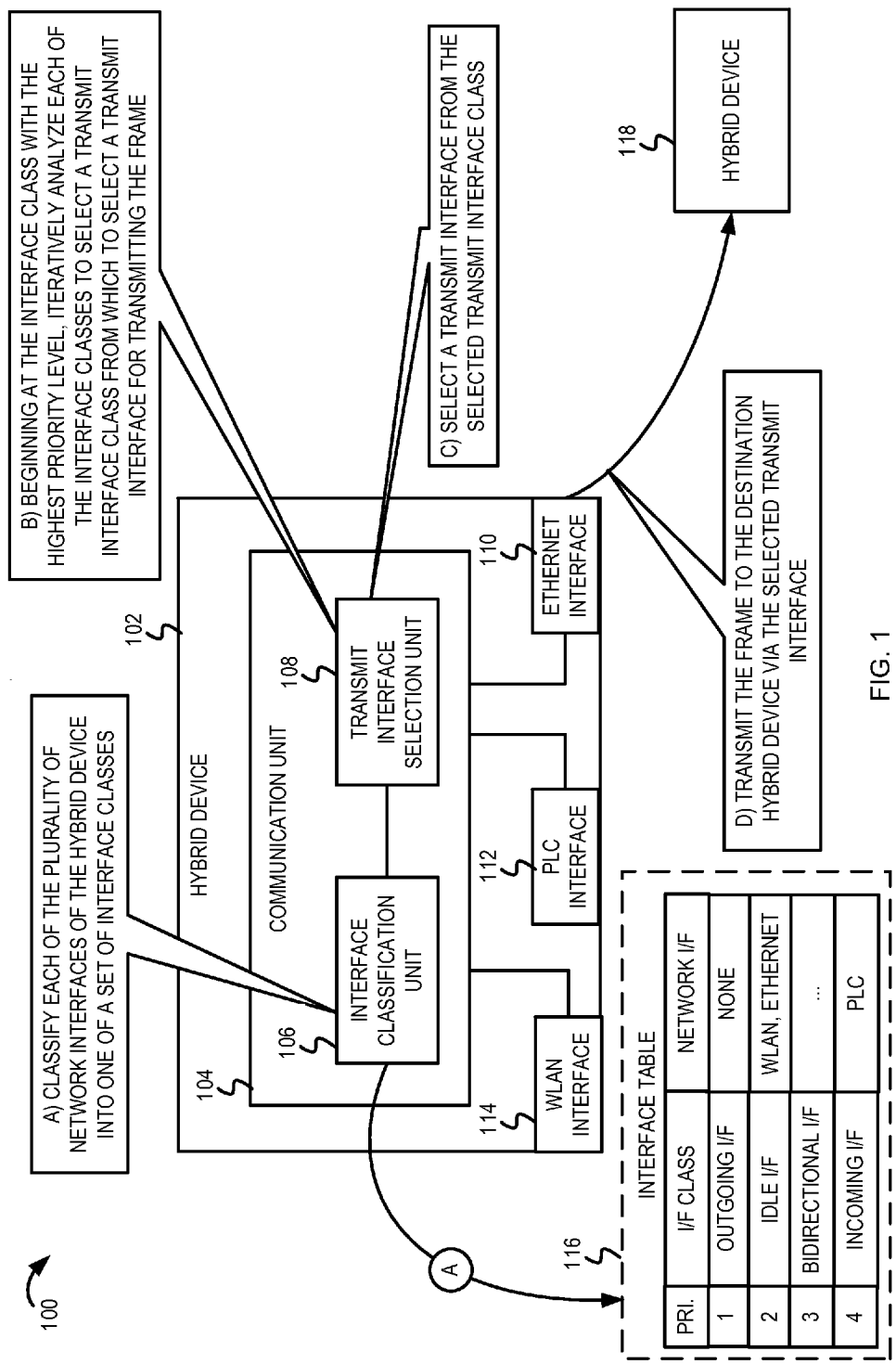
FIG. 1 is an example conceptual diagram illustrating a mechanism for selecting a transmit interface in a hybrid device.

FIG. 1 is an example conceptual diagram illustrating a mechanism for selecting a transmit interface in a hybrid device. FIG. 1 depicts a hybrid communication network 100. The hybrid communication network 100 comprises hybrid devices 102 and 118. The hybrid devices 102 and 118 comprise multiple network interfaces that utilize a plurality of communication protocols (which may also be referred to as access technologies) to couple the hybrid device to a plurality of communication network segments of the hybrid communication network 100. In FIG. 1, the hybrid device 102 comprises three network interfaces—an Ethernet interface 110, a PLC interface 112, and a WLAN interface 114 that couple the hybrid device 102 to an Ethernet, a powerline network, and a WLAN respectively. The hybrid devices 102 and 118 can comprise the same number of network interfaces, different number of network interfaces, same type of network interfaces, or different type of network interfaces. The hybrid device 102 comprises a communication unit 104. The communication unit 104 comprises an interface classification unit 106 and a transmit interface selection unit 108. The interface classification unit 106 can classify each network interface 110, 112, and 114 of the hybrid device 102 into an appropriate interface class based on, for example, whether the network interface has incoming traffic and/or outgoing traffic, as will be described below in stages A and B. The transmit interface selection unit 108 can select a transmit interface from which the hybrid device 102 can transmit a frame to a destination device (e.g., the hybrid device 118) based, at least in part, on the interface classes, as will be further described below in stage C. Although not depicted in FIG. 1, the hybrid device 118 can also comprise a communication unit including an interface classification unit and a transmit interface selection unit. The communication units of the hybrid devices 102 and 118 can each execute the operations described herein to select a transmit interface (for transmitting each frame scheduled for transmission) for their respective hybrid devices. Each hybrid device 102 comprises multiple lower protocol layers (i.e., multiple medium access layers and physical layers (MAC/PHY layers)) that correspond to the multiple network interfaces associated with the hybrid device. For example, the hybrid device 102 comprises three network interfaces 110, 112, and 114 and may comprise three corresponding sets of MAC/PHY layers. The hybrid device 102 comprises a single set of upper protocol layers (e.g., network layer, transport layer, application layer of the Open Systems Interconnection (OSI) model). The hybrid device 102 also comprises a hybrid networking sub-layer that acts as an intermediary between the multiple lower protocol layers (MAC/PHY layers) and the single upper protocol layers.

The hybrid devices 102 and 118 can each be electronic devices configured to implement a plurality of communication protocols or access technologies, such as a laptop computer, a tablet computer, a mobile phone, a smart appliance, a gaming console, an access point, a desktop computer, or other suitable electronic devices. In some embodiments, the communication units of the hybrid devices 102 and 118 can be implemented as part of the hybrid networking sub-layer of the respective hybrid devices 102 and 118. The communication units of the hybrid devices 102 and 118 can each be implemented on a system-on-a-chip (SoC), an application specific integrated circuit (ASIC), or another suitable integrated circuit to enable network communications on their respective hybrid device. In some embodiments, the communication units may each be implemented in one or more integrated circuits on one or more circuit boards of their respective hybrid device.

At stage A, the communication unit 104 (e.g., the interface classification unit 106) classifies each of the plurality of network interfaces 110, 112, and 114 of the hybrid device 102 into one of a set of interface classes based on the direction of traffic (e.g., whether incoming or outgoing) at each of the network interfaces. In some embodiments, the interface classification unit 106 can analyze incoming frames (e.g., topology messages, data frames, management frames, etc.) and previously transmitted frames and can determine which network interfaces had outgoing traffic and/or incoming traffic. It is noted that in some embodiments, the incoming traffic may include traffic intended for the hybrid device and/or traffic intended for other network devices that is "overheard" by the hybrid device over a shared broadcast medium. Accordingly, interface classification unit 106 can classify each network interface connecting the hybrid device 102 to its next communication link (also known as a "hop" or a path between two adjacent devices) as an outgoing interface (i.e., belonging to an outgoing interface class), an incoming interface (i.e., belonging to an incoming interface class), a bidirectional interface (i.e., belonging to a bidirectional interface class), or an idle interface (i.e., belonging to an idle interface class). The outgoing interface class includes those network interfaces from which the hybrid device 102 only transmits outgoing traffic to the next hop. In other words, the hybrid device 102 may have only transmitted frames from (and may not have received frames at) the outgoing network interfaces that belong to the outgoing interface class. The incoming interface class includes those network interfaces at which the hybrid device 102 only receives incoming traffic from a previous hop. In other words, the hybrid device 102 may have only received frames at (and may not have transmitted frames from) the incoming network interfaces. The bidirectional interface class includes those network interfaces from which the hybrid device 102 transmits outgoing traffic to the next hop and also receives incoming traffic from the previous hop. In other words, the hybrid device 102 may have received frames at and transmitted frames from the bidirectional network interfaces. The idle interface class includes those network interfaces from which the hybrid device 102 neither transmits outgoing traffic nor receives incoming traffic. In other words, the hybrid device 102 may not have received frames at and may not have transmitted frames from the idle network interfaces. With reference to the example of FIG. 1, the interface classification unit 106 may designate the WLAN interface 114 and the Ethernet interface 110 as idle interfaces and may designate the PLC interface 112 as an incoming interface as depicted by the interface table 116. Furthermore, the interface classification unit 106 may assign a priority level to each interface class. In the example interface table 116 of FIG. 1, the priority level can be assigned such that the interface classes beginning at the highest priority level are: 1) the outgoing interface class (highest priority level), 2) the idle interface class, 3) the bi-directional interface class, and 4) the incoming interface class (lowest priority level).

It is noted that in some embodiments, the interface classification unit 106 can analyze each of the network interfaces 110, 112, and 114 of the hybrid device 102 at periodic intervals to ensure that the network interfaces 110, 112, and 114 are assigned to the appropriate interface class. In some embodiments, the interface classification unit 106 can classify each of the network interfaces 110, 112, and 114 each time the hybrid device 102 determines to transmit a frame to another hybrid device (or legacy device) and/or each time the hybrid device 102 receives a frame. In other embodiments, the interface classification unit 106 may not classify the network interfaces 110, 112, and 114 prior to transmitting each frame. For example, initially (e.g., before the hybrid device transmits and/or receives any traffic), all the network interfaces can be designated as idle interfaces. As the network interfaces transmit and/or receive frames, the interface classification unit 106 can re-analyze the network interfaces to assign (if necessary) the network interfaces to different interface classes.

At stage B, in response to determining to transmit a frame to the hybrid device 118, the communication unit 104 (e.g., the transmit interface selection unit 108) iteratively analyzes each of the interface classes (beginning at the interface class with the highest priority level) to select an interface class ("transmit interface class") from which to select a transmit interface for transmitting the frame. At stage B, the communication unit 104 generates (or receives) a frame for transmission to the hybrid device 118. In some embodiments, the hybrid device 102 can be a hybrid source device that generates the frame for transmission to the hybrid device 118. In another embodiment, the hybrid device 102 may receive the frame from a legacy source device for transmission to the hybrid device 118. The legacy device may be a non-hybrid device that comprises a single network interface that couples the legacy device to a single communication network. In another embodiment, the hybrid device 102 may be a hybrid relay device that routes the frame from a hybrid source device to the hybrid device 118. Responsive to determining to transmit the frame to the hybrid device 118, the transmit interface selection unit 108 can successively check whether it has an outgoing interface, idle interface, a bidirectional interface, or an incoming interface, as will be further described in FIG. 2. In other words, the transmit interface selection unit 108 can first select a transmit interface class from which to select the transmit interface for transmitting the frame. The transmit interface selection unit 108 can successively analyze each of the interface classes to determine from which interface class to select the transmit interface. In selecting the transmit interface class, the first preference may be the outgoing interface class; the second preference may be the idle interface class; the third preference may be the bidirectional interface class; and the default selection may be the incoming interface class. Specifically, with reference to the example priority levels of FIG. 1, the transmit interface selection unit 108 can first determine whether the hybrid device 102 comprises any network interfaces that belong to the outgoing interface class. If there are none, the transmit interface selection unit 108 can determine whether the hybrid device 102 comprises any network interfaces that belong to the idle interface class. If there are none, the transmit interface selection unit 108 can determine whether the hybrid device 102 comprises any network interfaces that belong to the bidirectional interface class. If the hybrid device 102 does not comprise any outgoing interfaces, idle interfaces, or bidirectional interfaces, the transmit interface selection unit 108 can select the incoming interface class. With reference to the example interface table 116 of FIG. 1, the transmit interface selection unit 108 may determine that the hybrid device 102 does not comprise any outgoing interfaces, but that the hybrid device 102 comprises two idle interfaces. Accordingly, the transmit interface selection unit 108 may determine to select the transmit interface from the idle interface class.

At stage C, the transmit interface selection unit 108 selects the transmit interface from the transmit interface class selected at stage B. The transmit interface can be selected from the transmit interface class based on one or more performance characteristics and/or type of the network interfaces that belong to the transmit interface class. The transmit interface selection unit 108 can attempt to select the transmit interface so that the hybrid device 102 uses different network interfaces to transmit outgoing traffic and to receive incoming traffic, thus minimizing the possibility of collisions and contention. With reference to FIG. 1, to communicate with the hybrid device 118 that also supports PLC, WLAN, and Ethernet communication, the hybrid device 102 may transmit a frame to the hybrid device 118 via one of the network interfaces (e.g., the Ethernet interface 110) and may receive a frame from the hybrid device 118 via another distinct interface (e.g., the PLC interface 112). This can minimize contention between the hybrid devices 102 and 118 and can minimize the possibility that the hybrid devices 102 and 118 compete to use the same shared medium.

In some embodiments, the transmit interface class (selected at stage B) may comprise more than one constituent network interface. Referring to the example of FIG. 1, the idle interface class comprises two network interfaces 110 and 114 of the hybrid device 102. The transmit interface selection unit 108 can employ various techniques to select the transmit interface from multiple network interfaces 110 and 114 that belong to the transmit interface class. For example, the transmit interface selection unit 108 can select a transmit interface that is different from a network interface on which incoming traffic associated with a previous communication link (also known as a "hop" or a path between two adjacent devices) was received. In this example, if the hybrid device 102 received a frame from a source device on the PLC interface 112, the hybrid device 102 may not use the PLC interface 112 to forward the frame to the destination hybrid device 118. Instead, the hybrid device 102 may select another interface (e.g., the WLAN interface 114 or the Ethernet interface 110) to forward the frame. As another example, the transmit interface selection unit 108 can select the network interface with the best effective capacity as the transmit interface. As another example, the transmit interface selection unit 108 can select the network interface with the best contention efficiency (e.g., physical layer characteristics, medium access control layer contention resolution algorithms, error resolution mechanisms, etc.) as the transmit interface. In this example, based on contention efficiency, the transmit interface selection unit 108 may select the Ethernet interface 110 over the WLAN interface 114. As another example, the transmit interface selection unit 108 can select the transmit interface based on stream traffic patterns, available capacity/bandwidth of the network interface, bandwidth required by traffic (and type of traffic) that is scheduled to be transmitted via the transmit interface, etc. For example, if the transmit interface selection unit 108 "knows" that the hybrid device 102 will transmit high bandwidth video data frames to the hybrid device 118, then the transmit interface selection unit 108 can select the network interface with the highest bandwidth as the transmit interface. It is also noted that in other embodiments, the transmit interface selection unit 108 can employ other suitable techniques for selecting the transmit interface from the subset of network interfaces that belong to the selected transmit interface class. It is noted that the transmit interface selection unit 108 can use one of the above-described techniques or a combination or two or more of the above-described techniques to select the transmit interface from multiple network interfaces that belong to the selected transmit interface class.

At stage D, the hybrid device 102 transmits the frame to the hybrid device 118 via the selected transmit interface. For example, if the transmit interface selection unit 108 selects the Ethernet interface 110 as the transmit interface, the communication unit 104 can transmit the frame to the hybrid device 118 via the Ethernet interface 110. In some embodiments, after the frame is transmitted, the interface classification unit 106 can analyze the network interfaces (e.g., all the network interfaces 110, 112, and 114 or only the transmit interface 110) to determine whether to reclassify some/all the network interfaces. In this example, the Ethernet interface 110 was previously designated as an idle interface. After the frame is transmitted from the Ethernet interface 110, the interface classification unit 106 can designate the Ethernet interface 110 as an outgoing interface (and not an idle interface).

Figure 2:
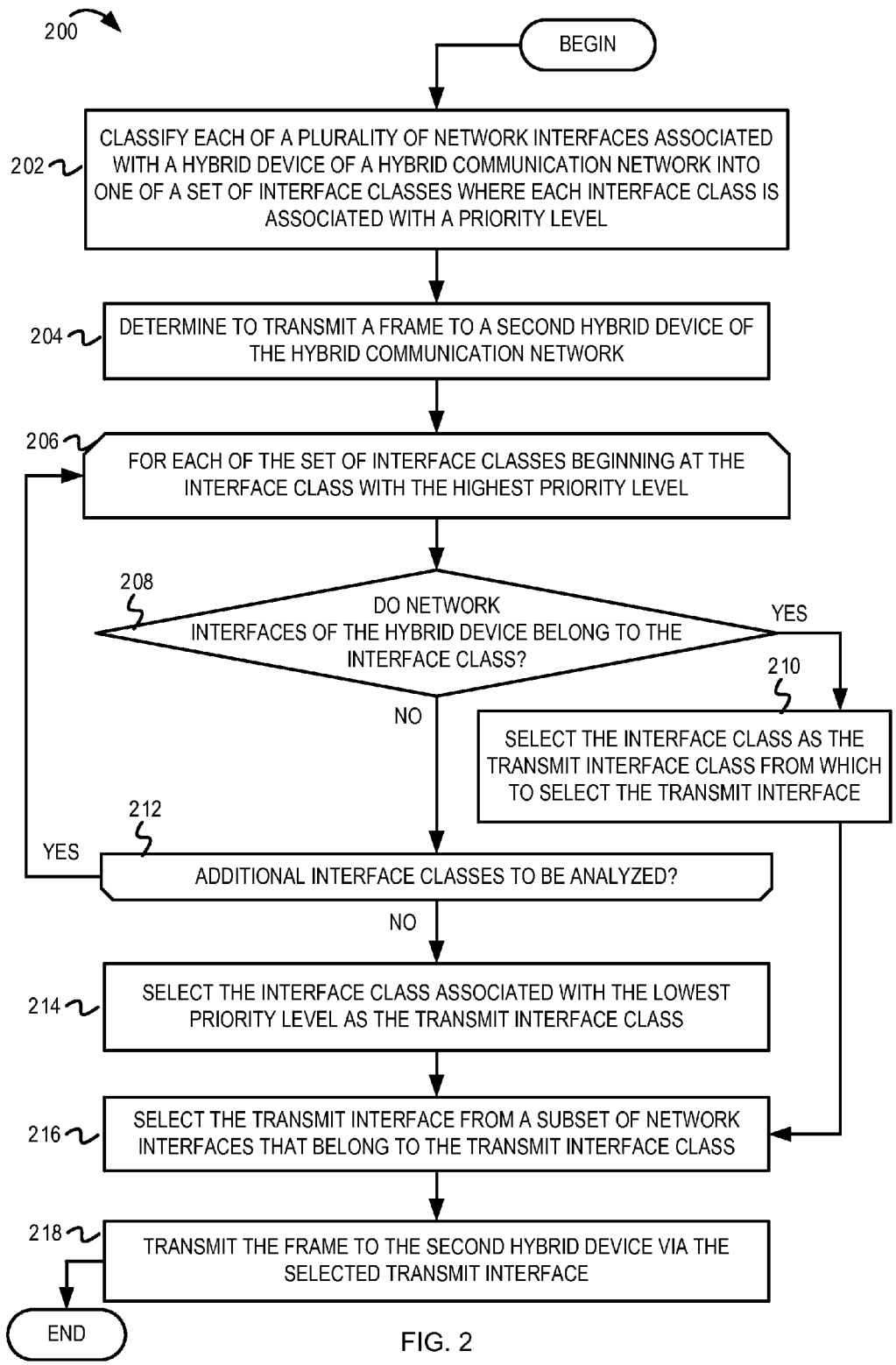
FIG. 2 is a flow diagram illustrating example operations for selecting a transmit interface of a hybrid device.

FIG. 2 is a flow diagram ("flow") 200 illustrating example operations for selecting a transmit interface of a hybrid device. The flow 200 begins at block 202.

At block 202, a hybrid device of a hybrid communication network classifies each of a plurality of network interfaces of the hybrid device into one of a set of interface classes where each interface class is associated with a priority level. With reference to the example of FIG. 1, the interface classification unit 106 of the hybrid device 102 can determine that the hybrid device 102 comprises an Ethernet interface 110, a PLC interface 112, and a WLAN interface 114 that couple the hybrid device 102 to an Ethernet segment, a powerline network segment, and a WLAN segment respectively of the hybrid communication network 100. The interface classification unit 106 can classify each of the network interfaces 110, 112, and 114 into one of four interface classes. In this example, each of the network interfaces 110, 112, and 114 can be classified as A) an outgoing interface that only transmits outgoing traffic to a next hop (a next network device along a transmission route), B) an incoming interface that only receives incoming traffic from a previous hop (e.g., a previous network device along a transmission route), C) a bi-directional interface that receives incoming traffic and transmits outgoing traffic, or D) an idle interface that neither receives incoming traffic nor transmits outgoing traffic. Furthermore, the interface classification unit 106 may assign a priority level to each of the interface classes. In some embodiments, the priority levels may be assigned such that the outgoing interface class has the highest priority level; the idle interface class has the next priority level; the bi-directional interface class has the next priority level; and the incoming interface class has the lowest priority level. It is noted that in other embodiments, the network interfaces can be classified into one of any suitable number of interface classes and each interface class can be assigned another suitable priority level. The flow continues at block 204.

At block 204, the hybrid device determines to transmit a frame to a second hybrid device of the hybrid communication network. In some embodiments, the hybrid device 102 may source the frame that is scheduled for transmission to the hybrid device 118. In other embodiments, the hybrid device 102 may receive the frame (from another hybrid device or legacy device) for forwarding to the hybrid device 118. The flow continues at block 206.

At block 206, a loop begins to analyze each interface class of the set of interface classes, beginning with the interface class with the highest priority level. For example, the transmit interface selection unit 108 (e.g., the hybrid networking sub-layer) of the hybrid device 102 can execute the operations described below in blocks 208-212 for each network device to select a transmit interface class and subsequently, a transmit interface from which the hybrid device 102 should transmit the frame. With reference to the example priority levels of FIG. 1, the transmit interface selection unit 108 can successively analyze the outgoing interface class, the idle interface class, the bidirectional interface class, and the incoming interface class to first select a transmit interface class from which to select the transmit interface and to then select the transmit interface from the selected transmit interface class. The flow continues at block 208.

At block 208, it is determined whether any network interfaces of the hybrid device belong to the interface class being analyzed. For example, the transmit interface selection unit 108 can access the interface table 116 to determine whether any network interfaces of the hybrid device belong to the interface class being analyzed. With reference to the example priority levels of FIG. 1, the transmit interface selection unit 108 can first determine whether any network interfaces of the hybrid device 102 belong to the outgoing interface class. Referring to the interface table 116, the transmit interface selection unit 108 can determine that the hybrid device 102 does not comprise any outgoing interfaces. The transmit interface selection unit 108 can determine whether any network interfaces of the hybrid device 102 belong to the idle interface class. Referring to the interface table 116, the transmit interface selection unit 108 can determine that the hybrid device 102 comprises two network interfaces 110 and 114 that are designated as idle interfaces. If it is determined that the hybrid device comprises at least one network interface that belongs to the interface class being analyzed, the flow continues at block 210. Otherwise, if it is determined that the hybrid device does not comprise any network interfaces that belong to the interface class, the flow continues at block 212.

At block 210, the interface class is designated as the transmit interface class from which the transmit interface will be selected. The flow 200 moves from block 208 to block 210 if the transmit interface selection unit 108 determines that the hybrid device 102 comprises at least one network interface that belongs to the interface class. Referring to the example of FIG. 1, the transmit interface selection unit 108 may determine that the transmit interface should be selected from the idle interface class. Accordingly, the idle interface class can be designated as the transmit interface class. From block 210, the flow continues at block 216, where the transmit interface is selected from network interfaces that belong to the selected transmit interface class.

At block 212, it is determined whether there are additional interface classes to be analyzed. The flow 200 moves from block 208 to block 212 if the transmit interface selection unit 108 determines that the hybrid device 102 does not comprise any network interfaces that belong to the interface class. As discussed above, the transmit interface selection unit 108 can iteratively analyze each of the interface classes (beginning at the interface class with the highest priority) until it finds an interface class that comprises at least one network interface of the hybrid device 102. If the transmit interface selection unit 108 determines that there are additional interface classes that should be analyzed, the flow loops back to block 206, where the next interface class at the next priority level is identified and the operations described above with reference to blocks 208-212 are executed for the next interface class. Otherwise, if it is determined that all the interface classes have been analyzed, the flow continues at block 214.

At block 214, the interface class associated with the lowest priority level is designated as the transmit interface class. The flow 200 moves from block 212 to block 214 if the transmit interface selection unit 108 determines that none of the network interfaces of the hybrid device 102 belong to the interface classes associated with the higher priority levels (i.e., all the network interfaces of the hybrid device 102 belong to the interface class associated with the lowest priority level). Referring to the example of FIG. 1, the transmit interface selection unit 108 may determine that all the network interfaces 110, 112, and 114 belong to the incoming interface class and that none of the network interfaces belong to the outgoing interface class, the idle interface class, or the bidirectional interface class. Accordingly, the transmit interface selection unit 108 can designate the incoming interface class as the transmit interface class. The flow continues at block 216, where the transmit interface is selected from network interfaces that belong to the selected transmit interface class.

At block 216, the transmit interface is selected from a subset of network interfaces that belong to the transmit interface class (selected at block 210 or block 214). For example, the transmit interface selection unit 108 may select the idle interface class as the transmit interface class. In FIG. 1, the Ethernet interface 110 and the WLAN interface 114 of the hybrid device 102 belong to the idle interface class. The transmit interface selection unit 108 can employ various techniques to select the best of the available multiple idle interfaces 110 and 114 as the transmit interface, as discussed above in stage C of FIG. 1. For example, the transmit interface selection unit 108 can select the transmit interface, so that the selected transmit interface is different from a receive interface of a previous hop. As another example, the transmit interface selection unit 108 can select the transmit interface based on comparing interface characteristics associated with each of network interfaces that belong to the transmit interface class. The transmit interface selection unit 108 may select (as the transmit interface) the network interface with the shortest distance, lowest medium utilization, existing traffic, contention efficiency, etc. With reference to FIG. 1, the transmit interface selection unit 108 may select the Ethernet interface 110 over the WLAN interface 114 because the Ethernet medium may have better contention efficiency and available capacity as compared to the WLAN medium. As another example, the transmit interface selection unit 108 can select the transmit interface from the transmit interface class based on knowledge of type/bandwidth/requirements of data that will be transmitted/received. The flow continues at block 218.

At block 218, the frame is transmitted to the second hybrid device via the selected transmit interface. With reference to the example of FIG. 1, if the transmit interface selection unit 108 selects the Ethernet interface 110 as the transmit interface, the hybrid device 102 (e.g., the communication unit 104) can transmit the frame to the hybrid device 118 from the Ethernet interface 110. From block 218, the flow ends.

Figure 3:
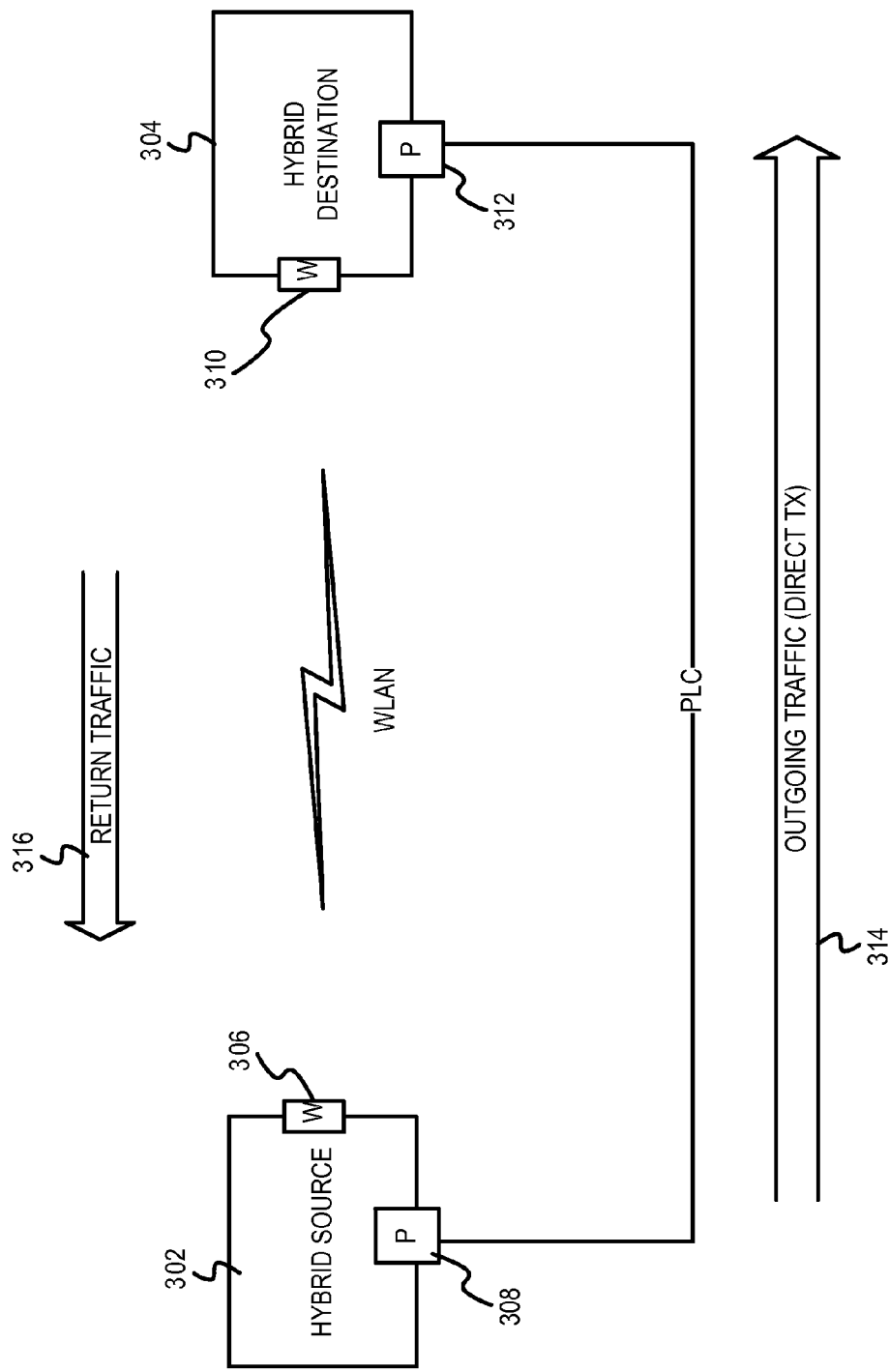
FIG. 3 is a conceptual diagram illustrating example operations for selecting a transmit interface for communication between hybrid devices.
Figure 4:
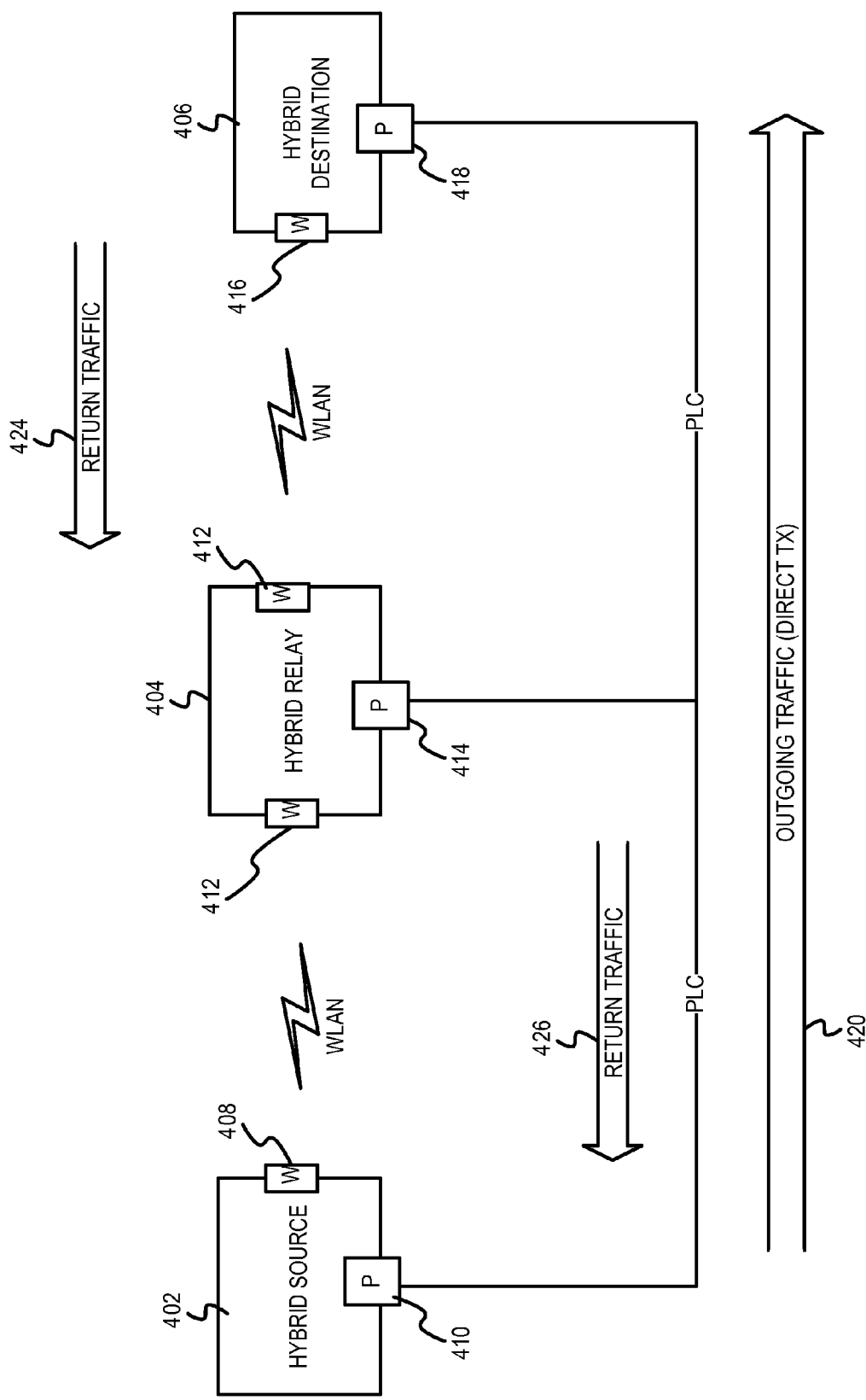
FIG. 4 is another conceptual diagram illustrating example operations for selecting a transmit interface for communication between hybrid devices.
Figure 5:
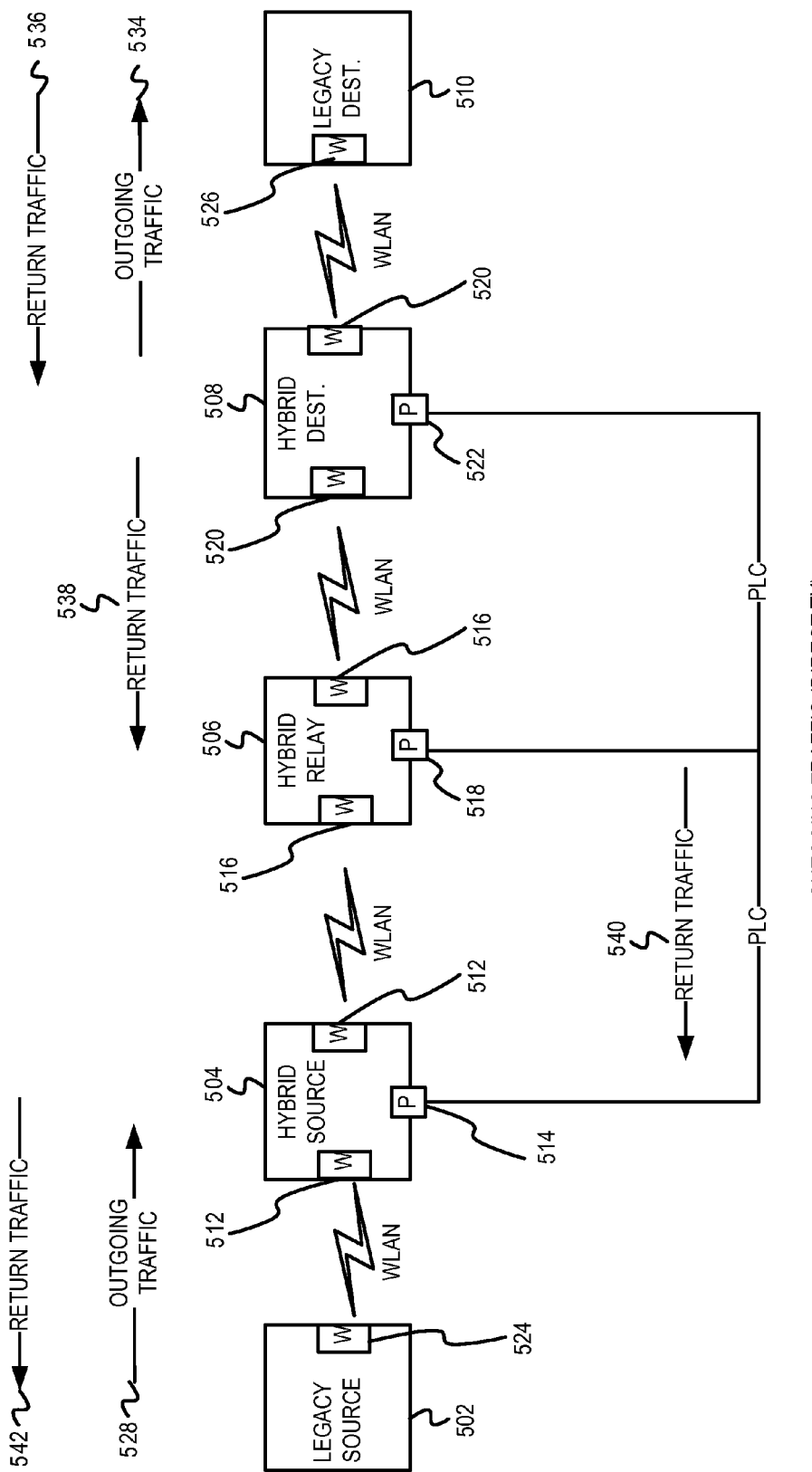
FIG. 5 is a conceptual diagram illustrating example operations for selecting a transmit interface for routing a frame in a hybrid communication network.

FIGS. 3, 4, and 5 will depict example transmission routes between network devices in a hybrid communication network and will illustrate how the hybrid devices select their respective transmit interface in accordance with the transmit interface selection mechanism described above in FIGS. 1-2. In FIGS. 3 and 4, the transmission route only comprises hybrid devices, while in FIG. 5, the transmission route comprises both hybrid devices and legacy devices.

FIG. 3 is a conceptual diagram illustrating example operations for selecting a transmit interface for communication between two hybrid devices. FIG. 3 depicts a hybrid source device 302 and a hybrid destination device 304. In FIG. 3, the hybrid source device 302 is directly coupled with the hybrid destination device 304 via a WLAN and a powerline network. The hybrid source device 302 comprises a WLAN interface 306 and a PLC interface 308, while the hybrid destination device 304 comprises a WLAN interface 310 and a PLC interface 312.

The hybrid source device 302 generates a frame for transmission to the hybrid destination device 304. Because the hybrid source device 302 is currently not transmitting/receiving frames on any of its network interfaces 306 and 308, both the network interfaces 306 and 308 of the hybrid source device 302 are designated as idle interfaces. The hybrid source device 302 (e.g., the transmit interface selection unit) can select one of the network interfaces to transmit the frame. For example, the hybrid source device 302 may select the PLC interface 308 as the transmit interface because the powerline medium may have a higher available capacity and a better contention efficiency as compared to the WLAN medium. The hybrid source device 302 transmits the frame (depicted as outgoing traffic 314) from its PLC interface 308 to the PLC interface 312 of the hybrid destination device 304. For the hybrid destination device 304, the PLC interface 312 is designated as an incoming interface and the WLAN interface 310 is designated as an idle interface. With reference to the priority levels of FIG. 1, the idle interface class has a higher priority level as compared to the incoming interface class. Therefore, the hybrid destination device 304 transmits a response frame (depicted as return traffic 316) from its WLAN interface 310 to the WLAN interface 306 of the hybrid source device 302. In one example, the outgoing traffic 314 can comprise transmission control protocol (TCP) data frames, while the return traffic 316 can comprise acknowledgement (ACK) frame.

FIG. 4 is another conceptual diagram illustrating example operations for selecting a transmit interface for communication between hybrid devices. FIG. 4 depicts a hybrid source device 402, a hybrid relay device 404, and a hybrid destination device 406. The hybrid source device 402 is coupled with the hybrid relay device 404; and the hybrid relay device 404 is coupled with the hybrid destination device 406. In the example of FIG. 4, there is also a direct communication link between the hybrid source device 402 and the hybrid destination device 406 via the powerline medium. The hybrid source device 402 comprises a WLAN interface 408 and a PLC interface 410; the hybrid relay device 404 comprises a WLAN interface 412 and a PLC interface 414; and the hybrid destination device 406 comprises a WLAN interface 416 and a PLC interface 418. It is noted that in FIG. 4, that the hybrid devices 402, 404, and 406 each comprise one physical WLAN interface 408, 412, and 416 respectively. Each of the WLAN interfaces 408, 412, and 416 acts as two logical interfaces. For example, the WLAN interface 412 of the hybrid relay device 404 can behave as a WLAN station (e.g., a first logical interface) when communicating with the hybrid destination device 406 and can behave as a WLAN access point (e.g., a second logical interface) when communicating with the hybrid source device 402. The hybrid source device 402 can be a hybrid device from where traffic (e.g., frames of a data stream) enters the hybrid communication network (e.g., from an upper protocol layer of the hybrid source device or from a non-hybrid/legacy end device). The hybrid destination device 406 can be a hybrid device from where traffic of a data stream leaves the hybrid communication network (e.g., to an upper protocol layer of the hybrid destination device or to a non-hybrid end device). Typically, the hybrid destination device is the hybrid source device for reverse traffic. The hybrid relay device 404 can be any hybrid device between the hybrid source device 402 and the hybrid destination device 406 that connects to the hybrid source device 402, the hybrid destination device 406, and/or another hybrid relay device via multiple network interfaces.

The hybrid source device 402 generates a frame for transmission to the hybrid destination device 406. Because the hybrid source device 402 is currently not transmitting/receiving frames on any of its network interfaces 408 and 410, both the network interfaces 408 and 410 of the hybrid source device 402 are designated as idle interfaces. The hybrid source device 402 (e.g., the transmit interface selection unit) can select one of the network interfaces to transmit the frame. For example, the hybrid source device 402 may select the PLC interface 410 as the transmit interface because the powerline medium may have a higher available capacity and a better contention efficiency as compared to the WLAN medium. The hybrid source device 402 directly transmits the frame (depicted as the outgoing traffic 420) from its PLC interface 410 to hybrid destination device 406. The hybrid destination device 406 receives the frame at its PLC interface 418 from the hybrid source device 402. For the hybrid destination device 406, the PLC interface 418 is designated as an incoming interface and the WLAN interface 416 is designated as an idle interface. Therefore, the hybrid destination device 406 transmits a response frame (depicted as return traffic 424) from the WLAN interface 416 to the hybrid relay device 404. For the hybrid relay device 404, both the WLAN interface 412 and PLC interface 414 are designated as incoming interfaces, via which the hybrid source can be directly reached. As discussed above, the PLC interface 414 of the hybrid relay device 404 can be designated as an incoming interface because the PLC interface 414 may receive the outgoing traffic 420 (transmitted by the source hybrid device 402 and intended for the destination hybrid device 406) on the shared powerline medium. The hybrid relay device 404 can select one of the interfaces, for example, that is associated with the higher available bandwidth. In the example of FIG. 4, the hybrid relay device 404 can select the WLAN interface 412 as the transmit interface. The hybrid relay device 404 can forward the response frame (depicted as return traffic 426) to the hybrid source device 402 from the WLAN interface 412 (i.e., outgoing interface class with the highest priority level).

FIG. 5 is a conceptual diagram illustrating example operations for selecting a transmit interface for routing a frame in a hybrid communication network. FIG. 5 depicts a hybrid communication network including a legacy source device 502, a hybrid source device 504, a hybrid relay device 506, a hybrid destination device 508, and a legacy destination device 510. The legacy source device 502 is coupled with the hybrid source device 504; the hybrid source device 504 is coupled with the hybrid relay device 506; the hybrid relay device 506 is coupled with the hybrid destination device 508; and the hybrid destination device 508 is coupled with the legacy destination device 510. The hybrid source device 504 comprises a WLAN interface 512 and a PLC interface 514; the hybrid relay device 506 comprises a WLAN interface 516 and a PLC interface 518; and the hybrid destination device 508 comprises a WLAN interface 520 and a PLC interface 522. The legacy source device 502 and the legacy destination device 510 each comprise a WLAN interface 524 and 526 respectively. As discussed above, it is noted that the hybrid devices 504, 506, and 508 each comprise one physical WLAN interface 512, 516, and 520 respectively. Each of the WLAN interfaces 512, 516, and 520 acts as two logical interfaces.

The legacy source device 502 generates a frame for transmission to the legacy destination device 510. Because the legacy source device 502 only comprises a WLAN interface 524, the legacy source device 502 transmits the frame from its WLAN interface 524 to the WLAN interface 512 of the hybrid source device 504 (depicted in FIG. 5 as outgoing traffic 528). The hybrid source device 504 receives the frame at its WLAN interface 512 and therefore, the WLAN interface 512 of the hybrid source device 504 is designated as an incoming interface. Because the PLC interface 514 of the hybrid source device 504 has not been used to transmit/receive frames, the PLC interface 514 of the hybrid source device 504 is designated as an idle interface. In accordance with the example priority levels of FIG. 1, the idle interface class has higher priority level as compared to the incoming interface class. Therefore, the hybrid source device 504 can select the PLC interface 514 as the transmit interface for transmitting the frame to the hybrid destination device 508. Because there is a direct communication link between the hybrid source device 504 and the hybrid destination device 508 via the powerline medium, the hybrid source device 504 transmits the frame from its PLC interface 514 to the PLC interface 522 of the hybrid destination device 508 (depicted in FIG. 5 as outgoing traffic 530). The PLC interface 514 of the hybrid source device 504 may now be designated as an outgoing interface.

The hybrid destination device 508 receives the frame at its PLC interface 522 from the hybrid source device 504 and therefore, the PLC interface 522 of the hybrid destination device 508 is designated as an incoming interface. Because the hybrid destination device 508 is scheduled to transmit the frame to the legacy destination device 510 that only comprises the WLAN interface 526, the hybrid destination device 508 may transmit the frame from the WLAN interface 520 to the WLAN interface 526 of the legacy destination device 510 (depicted in FIG. 5 as outgoing traffic 534).

The legacy destination device 510 can transmit a response/acknowledgement frame from its WLAN interface 526 to the WLAN interface 520 of the hybrid destination device 508 for forwarding to the legacy source device 502. This is illustrated in FIG. 5 as return traffic 536. The hybrid destination device 508 determines that its WLAN interface 520 is a bidirectional interface and that the PLC interface 522 is an incoming interface. In accordance with the example priority levels of FIG. 1, the incoming interface has a lower priority level as compared to the bidirectional interface; therefore, the hybrid destination device 508 transmits the frame from the WLAN interface 520 to the WLAN interface 516 of the hybrid relay device 506 (depicted in FIG. 5 as return traffic 538). The hybrid relay device 506 determines that its WLAN interface 516 is an incoming interface and that the PLC interface 518 is an incoming interface (due to carrier sensing of the traffic 530 transmitted by the hybrid source device 504 and intended for the destination hybrid device 508). The hybrid relay device 506 can select the interface that is, for example, associated with the higher available bandwidth. In the example of FIG. 5, the hybrid relay device 506 can select the PLC interface 518 as the transmit interface. The hybrid relay device 506 can transmit the frame (depicted in FIG. 5 as return traffic 540) from its PLC interface 518 to the PLC interface 514 of the hybrid source device 504. The hybrid source device 504 can determine to transmit the return traffic to the legacy source device 502 that only comprises a WLAN interface 524. Although the WLAN interface 512 of the hybrid source device 504 is an incoming interface, the hybrid source device 504 has no alternative but to transmit the frame from the WLAN interface 512 to the WLAN interface 524 of the legacy source device 502 (depicted in FIG. 5 as return traffic 542).

It is noted that although FIG. 5 depicts the hybrid devices 504, 506, and 508 comprising only two types of network interfaces, embodiments are not so limited. In other embodiments, each of the hybrid devices 504, 506, and 508 can comprise any suitable number and type of network interfaces. For example, the hybrid devices 504, 506, and/or 508 may comprise four network interfaces (e.g., a WLAN interface, an Ethernet interface, a PLC interface, and a MoCA interface). The hybrid source device 504 may receive the frame from the legacy source device 502 on the WLAN interface, determine that the Ethernet interface, the PLC interface, and the MoCA interface are idle interfaces, and select the "best" idle interface (e.g., in accordance with operations described above in block 216 of FIG. 2) from which to forward the frame to the hybrid relay device 506.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-5 describe transmit interface-selection in a distributed environment, where each hybrid device independently selects its transmit interface, embodiments are not so limited. In other embodiments, the operations for transmit interface selection can be executed in a centralized environment. In the centralized environment, a central controller can determine interface information (the traffic on each interface, the medium utilization, the available capacity for each communication medium, etc.) as seen by all the hybrid devices in the hybrid communication network and can determine which hybrid device should use which interface for transmitting frames to another device. The central controller can also communicate the interface information and/or an indication of the selected transmit interface to each hybrid device. In the centralized environment, the central controller can assign a cost to each communication link (also known as a "hop" or a path between two adjacent devices). For example, the central controller may assign a low cost to a communication link if the central controller does not detect any traffic (or potential collisions) on the communication link. As another example, the central controller can assign a high cost to the communication link, if the communication link is associated with at least one bidirectional interface. The central controller can calculate an aggregate cost associated with of each transmission route by summing the cost of each individual communication link that constitutes the transmission route. The central controller can select the most optimal transmission route (e.g., with the lowest aggregate cost). By employing a central controller to determine a transmit interface for a hybrid device, the central controller may not select the most optimal transmit interface for a single communication link (i.e., hop) but can instead select the transmit interface that results in the most optimal end-to-end transmission route.

In some embodiments, the two hybrid devices 102 and 118 communicating with each other may not exchange any information to select their respective transmit interfaces. In other embodiments, the two hybrid devices 102 and 118 may exchange information to select an appropriate transmit interface. For example, the hybrid devices 102 and 118 may exchange information regarding the type of traffic/frames that will be transmitted, the medium utilization and capacity as "seen" by each of the hybrid devices, and other suitable information that can be used to aid in selecting the transmit interface. Based on the exchanged information, the hybrid devices 102 and 118 may each determine that the hybrid device 102 will transmit high bandwidth video frames to the hybrid device 118 and that the hybrid device 118 will transmit low bandwidth acknowledgement frames to the hybrid device 102. The hybrid devices 102 and 118 can determine that the hybrid device 102 should use the high bandwidth PLC medium to transmit the video frames and that the hybrid device 118 should use its low bandwidth WLAN communication medium to transmit the acknowledgement frames. Accordingly, the hybrid device 102 can select its PLC interface as the transmit interface and the hybrid device 118 can select its WLAN interface as the transmit interface.

Although FIGS. 1-5 describe a hybrid device 102 selecting a transmit interface for communicating with another hybrid device 118, embodiments are not so limited. In other embodiments, a hybrid device 102 may communicate with a legacy device. In this embodiment, the hybrid device 102 uses the same network interface (based on the network interface of the legacy device) to transmit frames to and receive frames from the legacy device. With reference to the example of FIG. 5, to communicate with the legacy WLAN device 510, the hybrid device 508 may transmit and receive frames via the WLAN interface 520 of the hybrid device 508.

Although the Figures describe each network interface of the hybrid device 102 being classified into one of four interface classes, embodiments are not so limited. In other embodiments, each network interface of the hybrid device 102 can be classified into one of any suitable number of interface classes and the type of interface classes are not limited to those described above. Likewise, each interface class can be assigned any suitable priority level that is not limited to the priority levels described above. It is further noted that in addition to the transmit interface selection operations described above, the hybrid device 102 (e.g., the communication unit 104) can also execute operations for load balancing, route selection, frame forwarding, and/or other transmission operations in conjunction with the transmit interface selection operations.

In some embodiments, the transmit interface may be selected from an interface class based on stream classification information associated with the frame scheduled for transmission. The stream classification information can include a frame priority, frame type, source device, destination device, etc. For example, the transmit interface selection unit 108 may determine to select the transmit interface from the idle interface class. The idle interface class may comprise the WLAN interface 114 and the Ethernet interface 110. In addition to the transmit interface selection factors described above in stage C of FIG. 1 and block 216 of FIG. 2, the transmit interface selection unit 108 may take the stream classification information (e.g., the frame priority) into consideration while selecting the transmit interface. For example, the transmit interface selection unit 108 may determine to transmit frames belonging to a first data stream via the WLAN interface 114 and to transmit frames belonging to a second data stream (to the same destination device) via the Ethernet interface 110.

In some embodiments, frames belonging to different data streams but that are being transmitted in the same direction and via the same transmit interface can be aggregated. For example, the hybrid device 102 (e.g., the communication unit 104) may combine frames belonging to different data streams into one aggregate frame if all the constituent frames are being transmitted from the same transmit interface and to the same intermediate/forwarding device. Referring to the example transmission route of FIG. 4, the hybrid source device 402 may generate a first frame destined for the hybrid relay device 404 and a second frame destined for the hybrid destination device 406. The hybrid source device 402 may combine the first frame and the second frame into one aggregate frame and may transmit the aggregate frame to the hybrid relay device 404 (e.g., via the PLC interface 410). The hybrid relay device 404 can extract the first frame and can forward the second frame to the hybrid destination device 406. If the hybrid relay device 404 has a third frame to transmit to the hybrid destination device 406, the hybrid relay device 404 can combine the second frame and the third frame and can forward the aggregate frame to the hybrid destination device 406.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
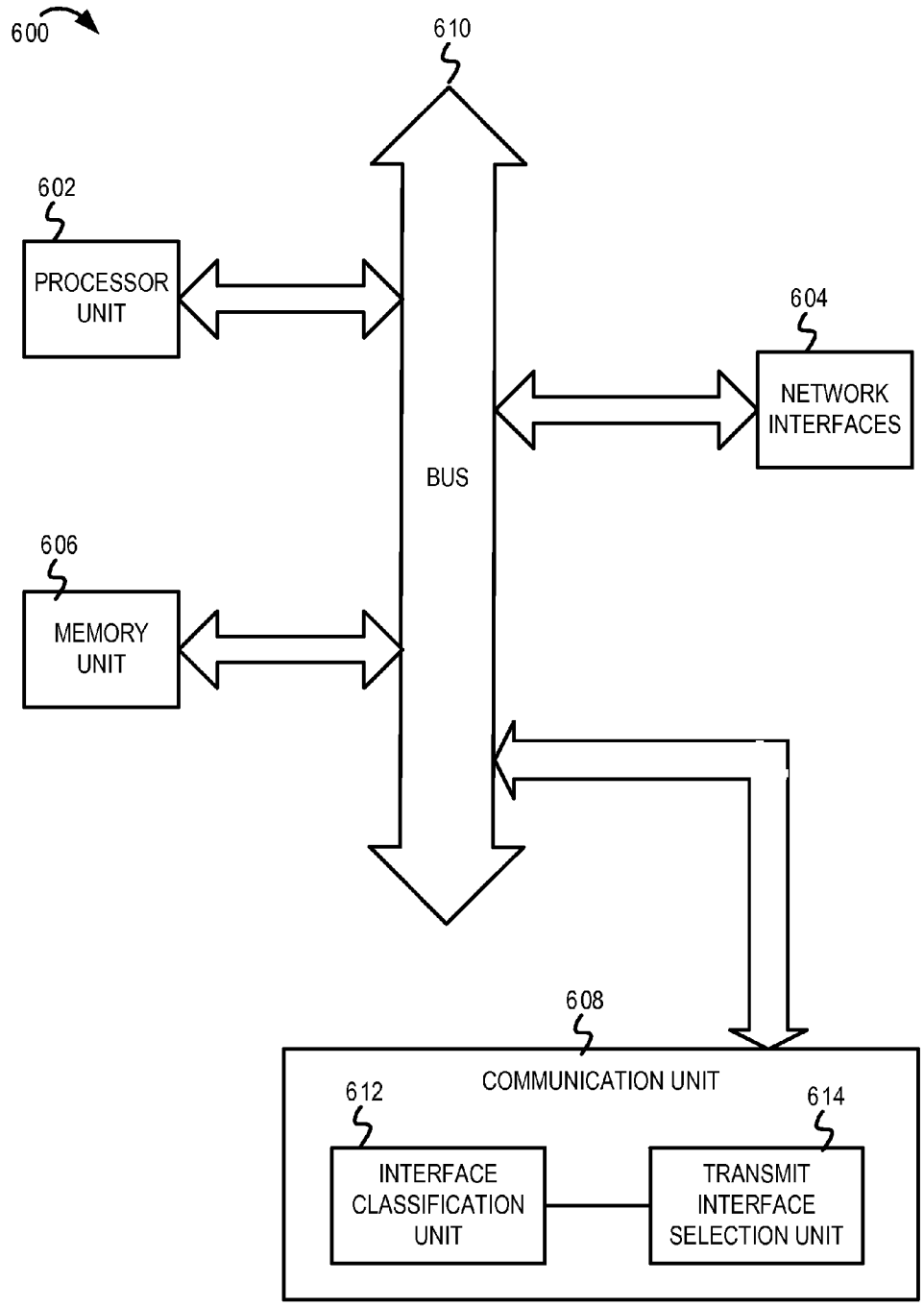
FIG. 6 is a block diagram of one embodiment of an electronic device including a transmit interface selection mechanism.

FIG. 6 is a block diagram of one embodiment of an electronic device 600 including a transmit interface selection mechanism. In some embodiments, the electronic device 600 can be a laptop computer, a tablet computer, a netbook, a mobile phone, a smart appliance, a gaming console, a desktop computer, or other suitable electronic device comprising communication capabilities. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.) that connect the electronic device 600 to a corresponding communication network (e.g., a WLAN, a PLC network and/or an Ethernet).

The electronic device 600 also includes a communication unit 608. The communication unit 608 comprises an interface classification unit 612 and a transmit interface selection unit 614. In some embodiments, the interface classification unit 612 and a transmit interface selection unit 614 can execute functionality described above with reference to FIGS. 1-5 to: A) assign each network interface of the electronic device 600 into an interface class based on the presence/absence of incoming and/or outgoing traffic at the network interface, B) select a transmit interface class from which a transmit interface should be selected, and C) select a transmit interface of the electronic device 600 from the selected transmit interface class from which to transmit the frame, as described above with reference to FIGS. 1-5. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). For example, the communication unit 608 may comprise one or more additional processors that are distinct from the processor unit 602 coupled with the bus 610. The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for selecting a transmit interface in a hybrid device as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a first network device, the method comprising:
    classifying each network interface of a plurality of network interfaces associated with the first network device into at least one of a plurality of interface classes based, at least in part, on whether the network interface has transmitted or received a communication within a time interval;
    selecting one of the plurality of interface classes as a transmit class based, at least in part, on a priority level associated with each of the plurality of interface classes;
    selecting one of the plurality of network interfaces of the transmit class as a first transmit interface, wherein a second network device is reachable via the first transmit interface; and
    transmitting a first frame from the first network device to the second network device via the first transmit interface.

2. The method of claim 1, further comprising:
    defining the plurality of interface classes, wherein each of the plurality of interfaces classes is associated with a priority level,
    wherein selecting the transmit class from the plurality of interface classes comprises:
        beginning at a highest priority level, for each priority level, determining that an interface class of the plurality of interface classes associated with the priority level comprises at least one network interface; and
        in response to determining that the interface class associated with the priority level comprises the at least one network interface, selecting the interface class associated with the priority level as the transmit class.

3. The method of claim 2, wherein in response to determining that the priority level is not the highest priority level, the method further comprises:
    determining that the priority level is a lowest priority level;
    in response to determining that the priority level is the lowest priority level, selecting the interface class associated with the lowest priority level as the transmit class; and
    in response to determining that the priority level is not the lowest priority level, determining to analyze a next interface class associated with a next lower priority level.

4. The method of claim 1, wherein selecting the first transmit interface comprises:
    determining to transmit the first frame to the second network device; and
    determining not to select a first network interface as the first transmit interface in response to determining that the first network device received a communication at the first network interface prior to said determining to transmit the first frame to the second network device.

5. The method of claim 1, wherein selecting the first transmit interface comprises at least one member of a group consisting of:
    selecting, as the first transmit interface, one of the plurality of network interfaces that is associated with a shortest distance to the second network device;
    selecting, as the first transmit interface, one of the plurality of network interfaces that is associated with a lowest medium utilization;
    selecting, as the first transmit interface, one of the plurality of network interfaces that is associated with a highest contention resolution efficiency;
    selecting, as the first transmit interface, one of the plurality of network interfaces that is associated with a highest available bandwidth;
    selecting, as the first transmit interface, one of the plurality of network interfaces based, at least in part, on a type of the first frame; and
    selecting, as the first transmit interface, one of the plurality of network interfaces based, at least in part, on a transmission requirement of the first frame.

6. The method of claim 1, wherein said classifying each network interface of the plurality of network interfaces comprises at least one member of a group consisting of:
    designating the network interface as an outgoing interface if the first network device has only transmitted a transmitted communication via the network interface within the time interval;
    designating the network interface as an incoming interface if the first network device has only received a received communication via the network interface within the time interval or sensed communication intended for other network devices over a shared communication medium;
    designating the network interface as a bidirectional interface if the first network device has transmitted the transmitted communication and received the received communication via the network interface within the time interval; and
    designating the network interface as an idle interface if the first network device has neither transmitted the transmitted communication nor received the received communication via the network interface within the time interval.

7. The method of claim 6, further comprising:
    re-classifying a first network interface associated with the first network device into a different one of the plurality of interface classes in response to at least one member of a group consisting of:
        transmitting a new communication from the first network interface,
        receiving a new communication at the first network interface, and
        determining that the time interval has elapsed.

8. The method of claim 1, wherein selecting the first transmit interface is based, at least in part, on one or more frame characteristics associated with the first frame.

9. The method of claim 8, wherein the one or more frame characteristics comprise one or more of a frame priority, a frame type, a source device that generated the first frame, and a destination device for which the first frame is destined.

10. The method of claim 1, further comprising:
selecting, from the plurality of network interfaces, a second transmit interface that belongs to the transmit class; and
transmitting a second frame to the second network device via the second transmit interface, wherein the first frame belongs to a first data stream and the second frame belongs to a second data stream.

11. The method of claim 10, wherein selecting the second transmit interface comprises one of:
executing operations, at the first network device, for selecting the second transmit interface from which to transmit the second frame to the second network device, or
receiving a notification from a central coordinator indicating that the first network device must transmit the second frame from the second transmit interface to the second network device.

12. The method of claim 1, further comprising:
receiving a response frame from the second network device at one of the plurality of network interfaces of the first network device that is distinct from the first transmit interface from which the first frame was transmitted from the first network device to the second network device.

13. The method of claim 1, further comprising:
determining to transmit a second frame to the second network device from the first transmit interface, wherein the first frame belongs to a first data stream and the second frame belongs to a second data stream;
aggregating the first frame and the second frame into an aggregate frame; and
transmitting the aggregate frame via the first transmit interface.

14. The method of claim 1, further comprising:
determining to transmit a second frame to a third network device from the transmit interface via the second network device;
aggregating, into an aggregate frame, the first frame that is destined for the second network device and the second frame that is destined for the third network device via the second network device; and
transmitting the aggregate frame via the first transmit interface to the second network device.

15. The method of claim 1, wherein if the first network device and the second network device both comprise two network interfaces,
said transmitting the first frame from the first network device to the second network device via the first transmit interface comprises transmitting the first frame from a first network interface of the first network device to a corresponding destination network interface of the second network device; and
the method further comprises receiving a response frame at a second network interface of the first network device from a corresponding source network interface of the second network device that is different from the corresponding destination network interface.

16. A first network device comprising:
a plurality of network interfaces; and
a communication unit in communication with the plurality of network interfaces, the communication unit operable to:
classify each network interface of the plurality of network interfaces into at least one of a plurality of interface classes based, at least in part, on whether the network interface has transmitted or received a communication within a time interval;
select one of the plurality of interface classes as a transmit class based, at least in part, on a priority level associated with each of the plurality of interface classes;
select one of the plurality of network interfaces of the transmit class as a first transmit interface, wherein a second network device is reachable via the first transmit interface; and
transmit a first frame from the first network device to the second network device via the first transmit interface.

17. The first network device of claim 16, wherein the communication unit operable to select the transmit class from the plurality of interface classes comprises the communication unit operable to:
define the plurality of interface classes, wherein each of the plurality of interfaces classes is associated with a priority level,
beginning at a highest priority level, for each priority level,
determine that an interface class of the plurality of interface classes associated with the priority level comprises at least one network interface; and
in response to determining that the interface class associated with the priority level comprises the at least one network interface,
select the interface class associated with the priority level as the transmit class.

18. The first network device of claim 16, wherein the communication unit operable to select the first of the plurality of network interfaces that belongs to the transmit class as the transmit interface for the first frame comprises the communication unit operable to:
determine to transmit the first frame to the second network device; and
determine not to select a first network interface as the first transmit interface in response to determining that the first network device received a communication at the first network interface prior to the communication unit determining to transmit the first frame to the second network device.

19. The first network device of claim 16, wherein the communication unit operable to select the first transmit interface comprises the communication unit performing at least one operation from a group consisting of:
selecting, as the first transmit interface, one of the plurality of network interfaces that is associated with a shortest distance to the second network device;
selecting, as the first transmit interface, one of the plurality of network interfaces that is associated with a lowest medium utilization;
selecting, as the first transmit interface, one of the plurality of network interfaces that is associated with a highest contention resolution efficiency;
selecting, as the first transmit interface, one of the plurality of network interfaces that is associated with a highest available bandwidth;
selecting, as the first transmit interface, one of the plurality of network interfaces based, at least in part, on a type of the first frame; and
selecting, as the first transmit interface, one of the plurality of network interfaces based, at least in part, on a transmission requirement of the first frame.

20. The first network device of claim 16, wherein the communication unit operable to select the first transmit interface based, at least in part, on one or more frame characteristics associated with the first frame.

21. The first network device of claim 16, wherein the communication unit is further operable to:
  select, from the plurality of network interfaces, a second transmit interface that belongs to the transmit class; and
  transmit a second frame to the second network device via the second transmit interface, wherein the first frame belongs to a first data stream and the second frame belongs to a second data stream.

22. The first network device of claim 16, wherein the communication unit is further operable to:
  determine to transmit a second frame to the second network device from the first transmit interface, wherein the first frame belongs to a first data stream and the second frame belongs to a second data stream;
  aggregate the first frame and the second frame into an aggregate frame; and
  transmit the aggregate frame via the first transmit interface.

23. A non-transitory machine-readable medium having instructions stored therein, which when executed by a processor of a first network device causes the first network device to perform operations that comprise:
  classifying each network interface of a plurality of network interfaces associated with the first network device into at least one of a plurality of interface classes based, at least in part, on whether the network interface has transmitted or received a communication within a time interval;
  selecting one of the plurality of interface classes as a transmit class based, at least in part, on a priority level associated with each of the plurality of interface classes;
  selecting one of the plurality of network interfaces of the transmit class as a first transmit interface, wherein a second network device is reachable via the first transmit interface; and
  transmitting a first frame from the first network device to the second network device via the first transmit interface.

24. The non-transitory machine-readable medium of claim 23, wherein selecting the transmit class from the plurality of interface classes comprises:
  defining the plurality of interface classes, wherein each of the plurality of interfaces classes is associated with a priority level,
  beginning at a highest priority level, for each priority level, determining that an interface class of the plurality of interface classes associated with the priority level comprises at least one network interface; and
    in response to determining that the interface class associated with the priority level comprises the at least one network interface,
      selecting the interface class associated with the priority level as the transmit class.

25. The non-transitory machine-readable medium of claim 23, wherein selecting the first transmit interface comprises:
  determining to transmit the first frame to the second network device; and
  determining not to select a first network interface as the first transmit interface in response to determining that the first network device received a communication at the first network interface prior to said determining to transmit the first frame to the second network device.

26. The non-transitory machine-readable medium of claim 23, wherein selecting the first transmit interface comprises at least one operation from a group consisting of:
  selecting, as the first transmit interface, one of the plurality of network interfaces that is associated with a shortest distance to the second network device;
  selecting, as the first transmit interface, one of the plurality of network interfaces that is associated with a lowest medium utilization;
  selecting, as the first transmit interface, one of the plurality of network interfaces that is associated with a highest contention resolution efficiency;
  selecting, as the first transmit interface, one of the plurality of network interfaces that is associated with a highest available bandwidth;
  selecting, as the first transmit interface, one of the plurality of network interfaces based, at least in part, on a type of the first frame; and
  selecting, as the first transmit interface, one of the plurality of network interfaces based, at least in part, on a transmission requirement of the first frame.

27. The non-transitory machine-readable medium of claim 23, wherein the operations further comprise:
  selecting, from the plurality of network interfaces, a second transmit interface that belongs to the transmit class; and
  transmitting a second frame to the second network device via the second transmit interface, wherein the first frame belongs to a first data stream and the second frame belongs to a second data stream.

28. The non-transitory machine-readable medium of claim 23, wherein the operations further comprise:
  receiving a response frame from the second network device at one of the plurality of network interfaces of the first network device that is distinct from the first transmit interface from which the first frame was transmitted from the first network device to the second network device.

29. The non-transitory machine-readable medium of claim 23, wherein the operations further comprise:
  determining to transmit a second frame to the second network device from the first transmit interface, wherein the first frame belongs to a first data stream and the second frame belongs to a second data stream;
  aggregating the first frame and the second frame into an aggregate frame; and
  transmitting the aggregate frame via the first transmit interface.

30. The method of claim 1, wherein the plurality of interface classes includes classes for outgoing interfaces, incoming interfaces, bidirectional interfaces, and idle interfaces.

* * * * *